ered Nov. 26, 1957

2,814,569

HIGH-ALPHA CELLULOSE PULP

Paul Henry Schlosser, Reid Logan Mitchell, and Kenneth Russell Gray, Shelton, Wash., assignors to Rayonier Incorporated, Shelton, Wash., a corporation of Delaware No Drawing. Application May 24, 1952,
Serial No. 289,883

1 Claim. (Cl. 106—163)

This invention relates to high-alpha cellulose wood pulp and has for its object the provision of certain improvements in such pulp, in products made therefrom, and in methods of using the products.

The invention is particularly concerned with high-alpha cellulose wood pulp, containing residual resins of the wood, primarily advantageous for use in the viscose and acetate processes and provides improved pulp of this character comprising an added non-ionic water-soluble polypropylene oxide-polyethylene oxide polymerization product containing at least one lipophilic polypropylene oxide radical and one hydrophilic polyethylene oxide radical (for brevity hereinafter called "polymers").

In one of its aspects, the invention contemplates the steeping of dried high-alpha cellulose pulp containing at least one of the polymers in aqueous caustic soda of mercerizing strength, resulting in a more rapid, uniform, and complete mercerization. Further improvements result when the alkali cellulose so produced is utilized in the production of other cellulose derivatives, such as cellulose xanthate.

While the removal of the ether extractable resins of the pulp is desirable from the standpoint of the physical properties of the yarn or cord, certain of such impurities, normally present in small amounts, are highly beneficial in promoting reactivity in the viscose process, especially as regards producing a reactive shredded alkali cellulose. These impurities which act beneficially in aiding the shredding operation are probably of the nature of fiber lubricants which permit the steeped and pressed pulp sheets to be more readily shredded into a porous form easily accessible to carbon bisulfide and without mechanical damage to the alkali cellulose fibers which would cause them to react incompletely with the carbon bisulfide. Pulp sheets which may tend to be unreactive toward processing into derivatives in aqueous solution will in general have an ether extract of not more than about 0.10% in the pulp after the purification process. Such unreactivity will tend to increase as the residual ether extract approaches zero. We have discovered also that the polymers used in the invention when added to pulp of low ether extract (low resin content) will improve the operation of shredding the alkali cellulose.

The polymers introduced into the reacting constituents of the viscose process as aforementioned give the additional benefits of improving the brightness and color of the yarn or cord and suppressing spinneret cratering. The term "cratering" refers to the formation of incrustations inside and/or around the outside of the holes of the spinnerets in spinning, which have the effect of reducing the size of the filaments, causing broken or faulty filaments and other difficulties. In fact, the suppression of spinneret cratering is equal or superior to that achieved by materials used specifically for that purpose.

In the preparation of sheets from refined wood pulp, the purified fibers are first obtained in the form of a slurry in water. In this undried state, the refined wood pulp fibers are potentially very reactive, since, if the water in the wet fibers in first displaced by an organic solvent, the fibers react very rapidly in non-aqueous processes, such as in the production of cellulose acetate. It is customary in present practices to form the pulp fibers into a dried sheet, using heat to remove the final quantity of water from the pulp. We have discovered that the addition of the polymers to the pulp, preferably in minute quantities, prior to completion of drying, greatly minimizes inactivation effects in cellulose acetate formation due to the drying of the pulp sheet from the wet fiber slurry. The improvement in reducing inactivation is reflected in filtration of the cellulose acetate where we have extended the filtering rate up to ten times that of the untreated pulp. The invention aims particularly to improve the completeness of acetylation and contemplates use in acylation processes of substantially dry refined wood pulp in sheet form having said polymers incorporated therein prior to completion of drying at an elevated temperature, whereby inactivation of the pulp in the production of cellulosic esters is minimized. As used herein, "substantially dry" refers to pulp either bone dry or containing that small moisture content, which pulp being a hydroscopic substance has taken up from the air. Roughly this will refer to pulp containing from zero to ten percent moisture. We may add the polymers to the pulp in any stage of its production; for example, we may spray it on the wet sheet before it goes to the drier, preferably after no further liquid water is to be removed, or we may apply it to the sheet after drying depending on the advantages to be derived as in the viscose or acetate processing operations.

For minimizing inactivity in the acetylation or other esterification processes carried out in non-aqueous solutions, it is important that at least the surface of the sheets be completely treated prior to final drying at elevated temperature. The polymers may be incorporated in the wood pulp at any stage in the production of dry sheet pulp from the wet fiber slurry. For treating the pulp, the compounds may be incorporated either in the bulk pulp before sheet formation or in the sheet at any stage prior to completion of the drying as by spraying the pulp with an aqueous solution or dispersion. A most practical and convenient method of securing the incorporation of the polymers prior to completion of drying is to incorporate the compound in the refined wood pulp while it is on the sheet forming machine by means of sprays or a rotating roll. Such application may be made to the wet pulp web subsequent to removal of the mechanically removable water by pressing, or later at any stage while it is passing through the hot dryer rolls prior to completion of drying.

When pulp is dried in a conventional manner on hot dryer rolls, inactivation of the fibers toward esterification is greatest on the surface of the sheets. The inactivation probably results from minute changes in physical structure of the fibers, as for example in hydrogen bonding, caused by loss of the last portions of water under conditions of high temperature. It is the function of the added compounds of the invention to prevent or minimize these physical changes and thus prevent or minimize inactivation. Thus, if desired, the treatment of the pulp sheet with the additives of the invention may be accomplished by spray or a rotating roll in such a manner that the additives are largely incorporated near one or both surfaces of the sheet. Thus, application is made largely to those fibers which would otherwise have the greatest tendency toward inactivation. In any event, there is produced a substantially dry sheet of pulp containing a polymer of the invention incorporated prior to completion of drying.

While the invention, as regards pulp for the acetate process, will be most usually applied in the drying of the pulp on the sheet-forming machine as described above, it may also be applied to the reactivation of the pulp fibers in a sheet which has been already dried at an elevated temperature. In such case the dried sheet pulp will have at least one or both surfaces treated with a water solution of the polymers, as by spraying, or the dried pulp will be completely treated by dipping. The sheet thus treated with a water solution of a polymer will be redried using such heat as may be practically required. In such method of application, it is believed that the reactivation is brought about at least in part by the rewetting of the sheet with the water and that one function of the polymer is to prevent or minimize loss during the second drying of the improved activity obtained by the rewetting operation in the same manner as above explained. Generally, however, where possible, it will be economically preferable to carry out the treatment with the polymers during the original drying on the sheet-forming machine so that rewetting and redrying will be unnecessary.

For use in improving mercerization in the viscose process, likewise the surfaces of the sheet, and preferably each individual fiber, should be completely treated. Where, however, the main purpose of treating the pulp is either to conveniently and accurately add the polymers for purposes of improving the reactivity in the viscose process, then substantial improvements may also be obtained by treating only portions of the sheet and even by application after drying. For example, for such purposes, the polymer addition may be applied in the form of a strip during the operation where the dried pulp in roll form is being cut into the form of sheets.

The polymers used in the invention differ from the conventional surface active materials in that they do not have a long chain hydrocarbon radical, but rather the lipophilic effect is derived from a multiplicity of short hydrocarbon chains of three carbon atoms connected to each other through ether oxygens. Also in comparison with conventional non-ionic surfactants derived from ethylene oxide, the compounds used in the invention have relatively long polyethylene oxide chains. There is thus in each a substantial hydrophilic attraction due to the combined effects of a great many weakly hydrophilic ether oxygen atoms in the polyethylene oxide radicals.

The polymers used in our invention are only subject to the limitations that they are water soluble polypropylene oxide-polyethylene oxide polymerization products containing at least one lipophilic polypropylene oxide radical and one hydrophilic polyethylene oxide radical and that generally the length of the polypropylene oxide chain (or where there are several chains the sum of the lengths of the several polypropylene oxide chains) is such that it would represent substantially water insoluble polypropylene oxide if they were not substituted by the polyethylene oxide chains, which render them water soluble. The following are three types of these compounds which may be readily prepared or obtained and which are especially effected in the invention:

TYPE 1.—HALOPOLYPROPENOXY POLYETHYLENE OXIDES

These compounds may be represented by the general formula

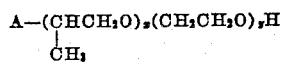

where A is a halogen atom. Suitable compounds are derived from a long chain polypropylene oxide having a specific viscosity of at least 0.129 and having one terminal halogen group and one terminal hydroxyl group, by substitution of the hydrogen in the terminal hydroxyl group by a polyethylene oxide chain. In general, for water solubility, the length of the polyethylene oxide chain will be such that the final compound will have a content of at least 40% ethylene oxide, the preferable range being 40–70%. An example of a suitable halopolypropenoxy polyethylene oxide for the preparation of these compounds is a long chain water insoluble polypropylene oxide having one chlorine atom as a terminal group and one hydroxyl group as a terminal group which may be prepared by polymerizing polypropylene oxide in the presence of a small amount of stannic chloride.

TYPE 2.—ALKOXY (OR PHENOXY) POLYPROPENOXY POLYETHYLENE OXIDES

These compounds may be represented by the general formula

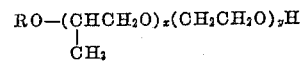

where R is an alkyl group with 1–7 carbon atoms or a phenyl group. Suitable compounds are derived from a polypropylene oxide of sufficient length to be substantially water insoluble as characterized by having a specific viscosity of at least 0.129 in 4 g./100 ml. benzene solution at 25° C. and having as one terminal group a small hydrocarbon group attached through an ether oxygen, the small hydrocarbon group being in itself of insufficient magnitude to influence surface activity, and one terminal hydroxyl group. From these water-insoluble polypropylene oxides the water soluble polymers are derived by substitutions of the hydrogen in the terminal hydroxyl group by a polyethylene oxide chain. In general, to impart water solubility, the polyethylene oxide chain will be of the same order of magnitude as in the polymers of Type 1. As examples of especially suitable water-insoluble alkoxy polypropylene oxides are polypropylene oxides prepared by polymerizing propylene oxide in the presence of a small amount of the monomethyl ether of propylene glycol (containing combined sodium up to the theoretical for the formation of a sodium alcoholate group) or in the presence of small amounts of sodium methylate.

TYPE 3.—BISPOLYPROPENOXY POLYETHYLENE OXIDES

These compounds may be represented by the general formula

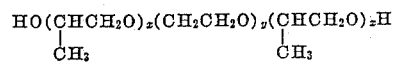

Suitable compounds are derived from a polyethylene oxide of chain length of the order of those in the polymers of Types 1 and 2 and having two terminal hydroxyl groups, the hydrogen of which are substituted by polypropylene oxide radicals. The polypropylene oxide chains are of sufficient length so that if they did not have a polyethylene oxide chain between them their combined length would represent a water insoluble polypropylene oxide. That is, the two polypropylene oxide chains if not separated by a polyethylene oxide chain would represent a polypropylene oxide having a specific viscosity of at least 0.129 in 4 g./100 ml. benzene solution or a calculated length of at least 13 propenoxy units.

The following examples are illustrative of methods of preparing polymers for use in practicing the invention:

*Preparation of Type 1 compounds (halopropenoxy polyethylene oxides)*

Very suitable members of this class are the chloropolypropenoxy polyethylene oxides. For the preparation of these compounds, a long chain water-insoluble polypropylene oxide having a chlorine atom as one terminal group and a hydroxyl group as the other terminal group is prepared by polymerizing propylene oxide in the presence of a small amount of stannic chloride. The amount of stannic chloride regulates the length of the chain inversely proportional to the amount in which it is present. The polymerization may conveniently be carried out in the general manner described in U. S. Patent 2,362,217 of Paul Henry Schlosser and Kenneth Russell Gray and suitable proportions of stannic chloride are from about 2.5 cc. down to about ½ cc. per 50 grams propylene oxide. Both for use in the further preparation of the nonionic surfactants and for characterization, the product should be de-tinned. This may readily be accomplished by boiling the tin-containing material with water, whereupon the tin separates out as a white precipitate, presumably stannic hydroxide. The tin-free product may then be extracted in benzene, dried with sodium sulfate, filtered, and the benzene evaporated off.

A small portion of the tin-free chloropolypropylene oxide is removed and characterized by determining the specific viscosity in 4 g./100 ml. benzene solution at 25° C. In the main portion of the product, sodium is incorporated in amounts up to the theoretical amount to convert the terminal hydroxyl group to a sodium alcoholate group. This may be conveniently accomplished by dissolving the polypropylene oxide in ether and mixing with liquid ammonia containing the required amount of sodium, and after allowing the ammonia to boil off, distilling off the ether. The sodium-containing chloropolypropylene oxide is then reacted in an autoclave with the required amount of ethylene oxide, conveniently at a temperature up to 60–100° C., until the pressure falls to zero. The alkali in the water-soluble polymer is neutralized with any of the common acids and most suitably by mixing a small amount of glacial acetic acid with the molten product.

*Preparation of Type 2 compounds (alkoxy (or phenoxy) polypropylene oxides)*

Very suitable members of this class, both from the standpoint of effectiveness and from the standpoint of economics, are the methoxy polypropenoxy polyethylene oxides. For the preparation of these compounds, a long chain water insoluble polypropylene oxide having as one terminal group a methoxyl group and as the other terminal group a hydroxyl group is prepared by polymerizing propylene oxide in the presence of a small amount of the monomethylether of propylene glycol in which up to 1 mol of combined sodium is introduced. Alternatively, this type of propylene oxide may be prepared by polymerizing propylene oxide in the presence of small amounts of methyl alcohol containing sodium methylate. In general, the lower the proportion of the monomethyl ether of propylene glycol containing sodium or the lower the proportion of methyl alcohol-sodium methylate, the higher will be the molecular weight. Where the monomethyl ether of propylene glycol is used to provide the terminal groups, sodium may be conveniently introduced by dissolving the monomethyl ether in ammonia and mixing it with sodium in ammonia, preferably using less than the theoretical amount of sodium. The monomethyl ether containing sodium is isolated by removing the ammonia under strictly anhydrous conditions and is used without delay in that it is not stable on long standing. The preparation of the water-soluble polymer involves reacting it with the required amount of ethylene oxide in an autoclave until the pressure falls to zero.

*Preparation of Type 3 compounds (bispolypropenoxy polyethylene oxides)*

Ethylene oxide may be polymerized in an autoclave by heating in the presence of a small amount of concentrated aqueous sodium hydroxide or in the presence of a small amount of ethylene glycol containing combined sodium. Where ethylene glycol containing combined sodium is used, the sodium may be introduced practically by heating the glycol with considerably less than the theoretical amount of sodium. Alternatively, larger amounts of sodium, up to the theoretical amount may be introduced by dissolving the glycol in ammonia, adding a further proportion of ammonia containing dissolved sodium, and evaporating off the ammonia. This higher proportion of sodium will in general permit a more rapid polymerization. In general, the smaller the amount of aqueous sodium hydroxide or the smaller amount of ethylene glycol containing combined sodium, the longer will be the length of the polyethylene oxide chain formed. The polyethylene oxide thus prepared will have two terminal hydroxyl groups and should have an average chain length of at least 24 ethenoxy units and more preferably a chain length of at least 36 ethenoxy units. From a small proportion of the polyethylene oxide product, sodium is removed for characterization purposes. To remove sodium, a portion of the product is neutralized with hydrochloric acid, dissolved in benzene, and dried by adding sodium sulfate. The sodium chloride and hydrated sodium sulfate are then filtered off and the benzene evaporated.

The sodium-free product is then characterized by determining the freezing point. The main portion of the polyethylene oxide still containing combined sodium is placed in an autoclave and reacted with a proper proportion of polypropylene oxide, suitably at a temperature in the range of 100–140° C., until the pressure falls substantially to zero. Alternatively, as a starting material for the reaction with propylene oxide, a commercial polyethylene oxide, such as is sold under the name of CARBOWAX may be used. Such products are already characterized by the manufacturer, both in regard to freezing point and average molecular weight. The sodium necessary for reaction with propylene oxide may be introduced into such polyethylene oxide by dissolving it in ammonia and adding a solution of sodium in liquid ammonia and evaporating off the ammonia. Amounts of sodium up to the theoretical to convert both hydroxyl groups to sodium alcoholate groups may be used. As a simpler means of introducing sodium, suitable for large scale operation, the CARBOWAX may be melted and heated with a small proportion of sodium which melts and after breaking into small globules will completely react. In this manner, it is not possible generally to introduce a large molar proportion of sodium but this merely means that the subsequent reaction with the propylene oxide will be somewhat slower at a given temperature than when higher proportions of sodium are introduced by the liquid ammonia method. A very suitable commercial polyethylene oxide for this purpose is CARBOWAX 1540 which is a polyethylene oxide containing two hydroxyl groups and which is considered to have an average molecular weight of 1540 which would represent about 35 ethenoxy groups.

For the preparation of the materials on a large scale, the procedure will be similar to that outlined for the preparation of the compounds of Types 1 to 3, except that it will usually be preferable to introduce ethylene oxide in gaseous form at a relatively low pressure from an external source during the course of the reaction. In this way, the possibility of uncontrolled reaction may be avoided, and, if desired, somewhat higher reaction temperatures may be used.

Three compounds were prepared by the methods described and which were found to have especially suitable properties in the invention are the following:

A. Chloropolypropenoxy polyethylene oxide in which the chloropolypropylene oxide having a specific viscosity of 0.257 in 4 g./100 ml. benzene solution at 25° C. is substituted by 1 polyethenoxy chain equivalent in weight to 90% of the total weight. The chlorine content of the chloropolypropylene oxide used was 1.48 percent corresponding to a molecular weight of about 2400.

B. Methoxypolypropenoxy polyethylene oxide in which methoxy polypropylene oxide having a specific viscosity of 0.137 in 4 g./100 ml. benzene solution at 25° C. is substituted by 1 polyethylene oxide chain equivalent in weight to 60% of the total weight. This is believed to represent an average composition of about 14.5 propenoxy units and about 29 ethenoxy units.

C. Bispolypropenoxy polyethylene oxide in which polyethylene oxide having an average of about 36 ethenoxy units is substituted at both ends by polypropylene oxide chains which together have an average of about 17 propenoxy units.

The effective proportion of the polymers, either as regards incorporation in the wood pulp during the production of dry sheet pulp from a wet slurry or for purposes of maintaining activity in the viscose process or for use in any stage of the viscose process up to the completion of the preparation of the viscose solution for improving spinning is 0.02 to 0.20% based on the bone dry pulp. Above this range in general no addtional advantages are obtained and particularly as regards to pulp a disadvantage may be obtained in that the sheet will tend to become undesirably soft. For treatment of pulp for use in acylation processes, a suitable proportion for adding the polymers is from 0.02 to 0.5% based on bone dry pulp, although larger proportions may be added if desired.

As previously discussed, sheet wood pulp dried in the presence of the polymers of the invention is markedly improved in acetylation reactivity compared with pulp dried in the conventional manner in the absence of these additives. This may be demonstrated by the following convenient and rapid laboratory test for comparing acetylation reactivity samples of wood pulp fibers.

EXAMPLE 1

Small specimens of the pulps to be examined are dipped in distilled water or distilled water containing the required amount of polymer and dried in a circulating oven at a controlled elevated temperature to dry them under comparable conditions. An accurately weighed sample of 0.5 gram of each pulp is torn into small bits and placed in a 35 ml. vial. A flattened glass rod is placed in the vial through a hole in the cap and the vial and sample set in a water bath at 20° C.

The acetylating mixture is prepared by mixing 2.500 gms. $H_2SO_4$, 88.0 ml. acetic anhydride, and 175.0 ml. acetic acid. This mixture is unstable and should be freshly prepared every two days.

To the sample vial in the water bath 15 ml. of the acetylating mixture are added from a pipette. The pulp and acid are mixed with the glass rod, which remains in the vial. The vials are stored in the water bath and the mixing repeated every 15–20 minutes. It is important to include a standard sample with each group of unknowns and to handle and agitate all samples alike.

As the pulp samples are acetylated by the mixture they dissolve continuously. The time required for substantial solution to take place and the relative clarity and residual undissolved fibers at the time of observation will indicate whether any of the samples is more or less reactive than the standard. An observation of color is also made.

A machine dried acetate pulp rewetted with distilled water and dried at 50° C. required 6.5 hours to be dissolved in the above acetylation test, and even then the solution contained some residual fibers. When another sample of the same pulp was treated in water solution with 0.4% of a chloropropenoxy polyethylene oxide and likewise dried at 50° C. it dissolved in four hours to give a solution free from residual fibers.

The sheet of wood pulp treated prior to completion of drying with the polymers has also markedly improved properties when used in aqueous reaction processes and particularly those involving a mercerizing step as in the viscose process. In these aqueous processes, the treated pulp sheets are wetted and penetrated more rapidly and uniformly by water or sodium hydroxide solution, the case of the latter giving more uniform mercerization. This may be demonstrated by the following rapid test for comparing the absorbency of the sheets of dried pulp.

EXAMPLE 2

Absorbency is determined by allowing a drop of NaOH solution to fall on the pulp sheet from a height of one to two centimeters and measuring the time required for the disappearance of the drop into the sheet.

A sample of pulp when treated with one of the aforementioned polymers in water solution and redried showed considerably increased absorptivity, indicating more thorough penetration and thereby more effective mercerization in actual viscose processing.

This beneficial effect exerted in the mercerizing process by the polymers as herein incorporated in pulp is notably different from the effect under similar circumstances of normal surface active agents which generally do not cause improved absorptivity or penetration of the pulp by caustic soda solutions of mercerizing strength.

When alkali cellulose prepared by the improved mercerized process or the improved mercerizing and shredding process of the invention is utilized in the viscose rayon process, certain further improvements are effective in the subsequent steps in xanthating, dissolving, and filtering. In viscose solutions there is usually a certain amount of undissolved fibers and gel-like material due to the incompleted reaction of the cellulose with carbon bisulfide during xanthation. Prior to spinning, the viscose solutions are filtered several times to remove gels and undissolved fibers. In the event that the viscose solutions contain excessive amounts of undissolved and partly dissolved fibers, filtration is an expensive operation. In such cases, the filters become rapidly clogged and the filter media must be changed frequently in order that the viscose will pass through in a reasonable time. Frequent changing of the filter media is expensive, not only as regards to consumption of filter cloth but also in view of the considerable amount of labor involved and also since a certain amount of viscose is lost every time the filter is opened up. Furthermore, when the viscose solutions contain very large proportions of gel-like material, filtration is usually not altogether satisfactory in that some of the smaller gel-like particles tend to pass through the pores of the cloth with adverse effect on the spinning operations.

We claim:

An improved high-alpha cellulose dissolving pulp suitable for conversion into cellulosic solutions which pulp contains residual ether extractable resins of the wood and from about 0.02% to 0.5% based on the bone dry weight of the pulp of an added non-ionic water-soluble polymerization product of the group consisting of

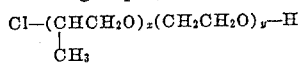

where

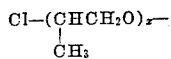

represents the radical of a water insoluble chloropolypropylene oxide having a specific viscosity in 4 g./100 ml. benzene solution at 25° C. of at least 0.129;

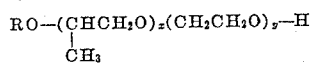

where R is a hydrocarbon radical selected from the class consisting of an alkyl radical with from 1–7 carbon atoms and a phenyl group and where

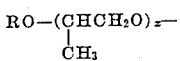

is the radical of a hydrocarbon-substituted polypropylene oxide having a specific viscosity in 4 g./100 ml. benzene solution at 25° C. of at least 0.129; and

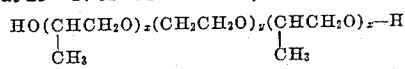

where both polypropylene oxide chains combined would represent a specific viscosity in 4 g./100 ml. benzene solution at 25° C. of at least 0.129, and wherein $y$ in each compound is such that the polyethylene oxide chain constitutes from 40% to 90% of the polymerization product by weight.

(References on following page)

References Cited in the file of this patent

UNITED STATES PATENTS

| | | |
|---|---|---|
| 2,362,217 | Schlosser et al. | Nov. 7, 1944 |
| 2,393,817 | Schlosser et al. | Jan. 29, 1946 |
| 2,481,693 | Schlosser et al. | Sept. 13, 1949 |

OTHER REFERENCES

"Soap and Sanitary Chemicals" (Suter and Kramer), August 1951, pp. 33–36 and 149.

"Pluronics" (Wyandotte Chemical Corp., Wyandotte, Mich.), March 1, 1952.